Dec. 29, 1942.                J. R. GOLDEN                2,306,535
                                 VALVE
                         Filed March 11, 1940

JOHN R. GOLDEN
INVENTOR.
BY Leon T. Hooper
ATTORNEY.

Patented Dec. 29, 1942

2,306,535

UNITED STATES PATENT OFFICE 2,306,535

VALVE

John R. Golden, Hammond, Ind.

Application March 11, 1940, Serial No. 323,248

2 Claims. (Cl. 251—131)

This invention relates to an improvement in float actuated valves of a type usually employed in reservoirs or other containers of liquid when it has reached a predetermined level. The present invention comprises fewer parts, is more positive in action, is much sturdier, and in various other ways is a decided improvement over my prior construction set forth in Patent No. 2,061,703, issued November 24, 1936.

The principal object of the present invention resides in the economical production of a highly efficient and silent article of the class referred to, which consists of a relatively few parts which are easily assembled to produce a rugged and sturdy device.

Another and further important object of advantage resides in the provision of means for adjusting the device without the aid of special tools or equipment.

Still another and further important object of advantage resides in the provision of means for providing the adjustment member with a telltale boss.

An additional object of advantage and importance resides in the provision of means for positioning a retard and mute member within the main discharge passageway.

Additional objects of advantage and importance will become apparent as the following detailed description progresses reference being had to the accompanying drawing, wherein Fig. 1 is a side elevational view of a valve which embodies the invention.

Figure 1:
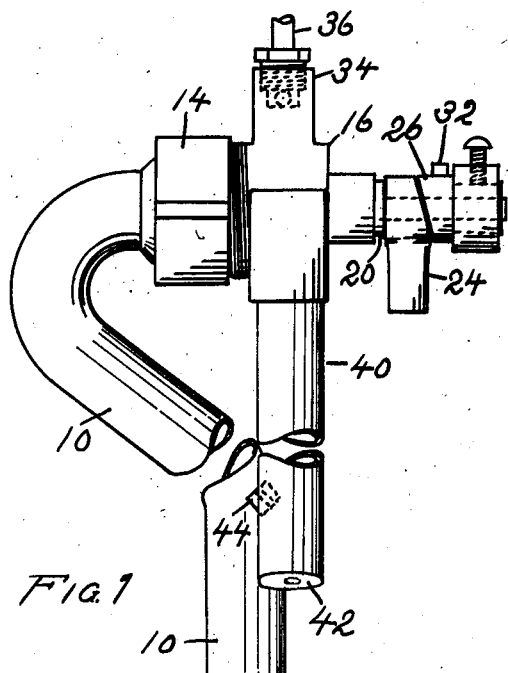

The reference numeral 10 indicates generally a more or less conventionally covered intake pipe. The lower end of the pipe 10 is threaded for connection to a fitting, and the upper portion of the pipe is flanged, as is best indicated by the reference numeral 12.

Secured in position against the flanges 12 of the pipe 10 by a union nut 14 is a valve body 16. The union nut 14 is in screw threaded association with the body 16 as is clearly shown in the drawing.

Removably positioned within the valve body 16 and forming a continuation of the passageway in the pipe 10 is a seat member 18. The seat member 18 is in water-tight association with the flanged end of the pipe 10.

Figure 3:
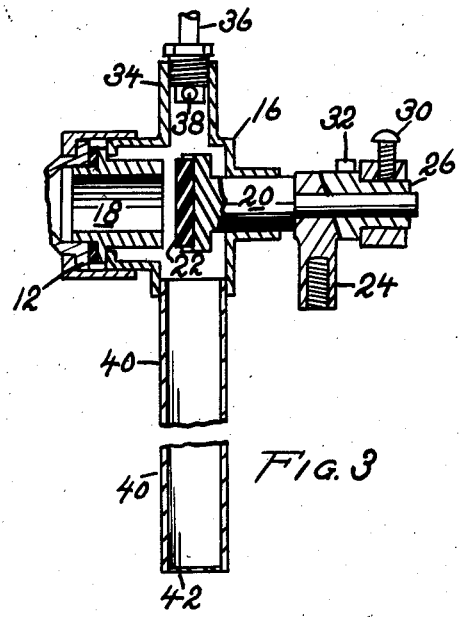
Fig. 3 is a vertical section taken on line 3—3 of Fig. 2, parts thereof being broken away.

Operably positioned within the valve is a valve stem 20. The inner end of the valve stem 20 is expanded as is best shown in Fig. 3. Formed in the face of the expanded end of the valve stem is a circular recess into which a washer 22 is pressed. The washer 22 may be additionally secured by any suitable means.

Pivotally positioned on an outwardly extending restricted portion of the stem 20 is a valve actuating member 24. The actuating member 24 is adapted to be secured to a float rod (not shown).

Positioned on the restricted portion of the stem 20 is a combination bearing and adjustment member 26. A face of the adjusting member 26 is in engagement with a face of the actuating member 24. The engaged faces of the actuating member 24 and the adjusting member 26 are correspondingly biased as is clearly shown in the drawing.

It will be apparent that rotative movement of the actuating member 24 on the stem 20 will by engagement of the biased faces of the members 24 and 26 cause the entire stem 20 to move into the body and engage the end of the replaceable set member 18.

Extending from the body, parallel to the valve stem 20 and thence being turned at right angles to itself is a bearing supporting arm 28. The bearing supporting arm 28 is apertured to receive the combination adjusting and bearing member 26 as is best shown in Fig. 3. A set screw 30 is provided for locking the member 26 in position.

Formed in the adjusting member 26 is a telltale boss 32. The telltale boss 32 enables a person adjusting the valve by rotating the member 26 to know the precise distance the member has been rotated.

Extending upwardly from the body 16 is an extension 34. Secured in the extension 34 is a pipe 36 which forms a continuation of a passageway from the body 16. The end of the pipe 36 within the extension 34 is closed and an opening 38 providing a passageway from the body 16 into the pipe 36 is formed in the side of the pipe 36. This opening 38 in the side of the pipe 36 tends to produce more silent action than would be the case if the opening was in the end of the pipe 36.

Projecting downwardly from the body 16 is a discharge pipe 40. Positioned in the end of the discharge pipe 40 is a closure member 42 having a restricted opening therein. The closure 42 with the small discharge opening therein acts as a mute when the device is in operation.

Figure 2:
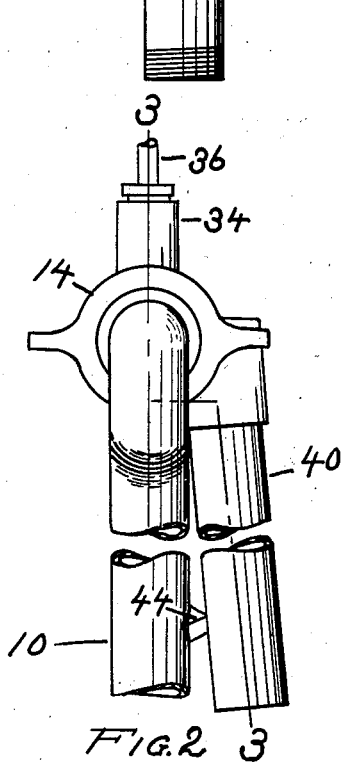
Fig. 2 is an end elevational view thereof.
Figure 4:
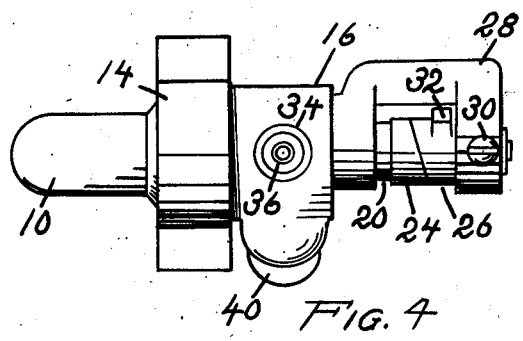
Fig. 4 is a top plan view of the device.

Positioned on the intake pipe 10 at a point where it will contact the discharge pipe 40 is an outwardly projecting boss 44. The boss 44 tends to hold the discharge pipe 40 at an angle as is best shown in Fig. 2. This angular positioning of the discharge pipe tends to make the device more silent in operation by directing the water angularly against the bottom of the tank thus preventing excessive splashing.

It is to be noted from the foregoing that the valve stem of the improved device of this invention is free for both rotative and longitudinal movement. No part is fixed to the stem. Thus, when the valve actuating member 24 swings to open or close the valve, the stem may slide longitudinally or it may rotate.

It will also be apparent from the foregoing that herein is provided a highly efficient and serviceable valve which is exceedingly quiet in operation.

It will also be apparent to those skilled in the art to which the improved device appertains that numerous changes and alterations in construction may be made without departing from the spirit and scope of this invention. Accordingly, the patent granted hereon is not to be limited to the preferred embodiment here shown nor in any other manner except as is necessitated by the terminology of the appended claims when given the range of equivalents to which they may be entitled.

I claim as my invention:

1. In a valve, a body, a stem extending from said body, a bearing support extending from said body to the outermost end of said stem, a combination bearing and adjustment member in operable association with said stem and said bearing supporting member, said combination member being adapted to be moved rotatively within said bearing support to alter the length of travel of said stem, means for facilitating and indicating the extent of movement of said combination member, and means for securing said combination member against rotative movement.

2. In a valve, a body, a stem extending from said body, a portion of said stem being of restricted diameter in relation to the balance thereof, an annular shoulder formed on said stem at the base of said restricted portion, an actuating member positioned on the restricted portion of said stem, one face of said actuating member being in engagement with said annular shoulder, the opposite face of said actuating member being formed at an angle to the vertical, and a member having a correspondingly formed face positioned on said stem outwardly of said actuating member with the angular faces thereof in opposed relation, said last named member being rotatably adjustable to govern the length of travel of said stem.

JOHN R. GOLDEN.